(12) United States Patent
Tatat et al.

(10) Patent No.: US 9,608,426 B2
(45) Date of Patent: Mar. 28, 2017

(54) CABLE AND CABLE PULLING METHOD

(75) Inventors: Olivier Tatat, Sangatte (FR); Alain Lavenne, Calais (FR); Jean-Pierre Bonicel, Rueil Malmaison (FR)

(73) Assignee: DRAKA COMTEQ B.V., Amsterdam (NL)

( * ) Notice: Subject to any disclaimer, the term of this patent is extended or adjusted under 35 U.S.C. 154(b) by 201 days.

(21) Appl. No.: 14/354,606

(22) PCT Filed: Oct. 28, 2011

(86) PCT No.: PCT/IB2011/003299
§ 371 (c)(1),
(2), (4) Date: Apr. 28, 2014

(87) PCT Pub. No.: WO2013/061111
PCT Pub. Date: May 2, 2013

(65) Prior Publication Data
US 2015/0114682 A1    Apr. 30, 2015

(51) Int. Cl.
| G02B 6/54 | (2006.01) |
| G02B 6/44 | (2006.01) |
| H02G 15/007 | (2006.01) |
| H02G 1/08 | (2006.01) |

(52) U.S. Cl.
CPC ......... *H02G 15/007* (2013.01); *G02B 6/4465* (2013.01); *G02B 6/54* (2013.01); *H02G 1/081* (2013.01)

(58) Field of Classification Search
CPC ...... G02B 6/54; G02B 6/4465; H02G 15/007; H02G 1/081
See application file for complete search history.

(56) References Cited

U.S. PATENT DOCUMENTS

| 1,733,279 A * | 10/1929 | Shults | F16G 11/00 403/284 |
| 3,909,886 A * | 10/1975 | Hocke | H02G 1/081 174/79 |
| 3,989,400 A * | 11/1976 | Smith | F16G 11/02 174/79 |
| 5,013,125 A * | 5/1991 | Nilsson | G02B 6/4477 254/134.3 R |
| 5,418,874 A * | 5/1995 | Carlisle | G02B 6/3887 385/139 |
| 2010/0202748 A1 * | 8/2010 | Pierce | H02G 1/081 385/136 |

FOREIGN PATENT DOCUMENTS

| CN | 101359817 A | 2/2009 |
| DE | 198 21 630 | 9/1999 |
| DE | 198 21 238 | 11/1999 |
| WO | 89/12175 | 12/1989 |
| WO | 00/60714 | 10/2000 |

OTHER PUBLICATIONS

International Search Report dated Oct. 29, 2012, corresponding to PCT/IB2011/003299.

\* cited by examiner

*Primary Examiner* — Michelle R Connelly
(74) *Attorney, Agent, or Firm* — Young & Thompson

(57) ABSTRACT

The cable (1) includes a cable outer sheath (12) surrounding a cable core (11) and at least a ring (21, 23, 25, 28, 30) surrounding partly the cable outer sheath (12) so that the ring (21, 23, 25, 28, 30) presses the cable outer sheath (12) on the cable core (11) in a way adapted to increase a transfer, on the cable core (11), of a pulling effort exerted on the cable outer sheath (12).

20 Claims, 4 Drawing Sheets

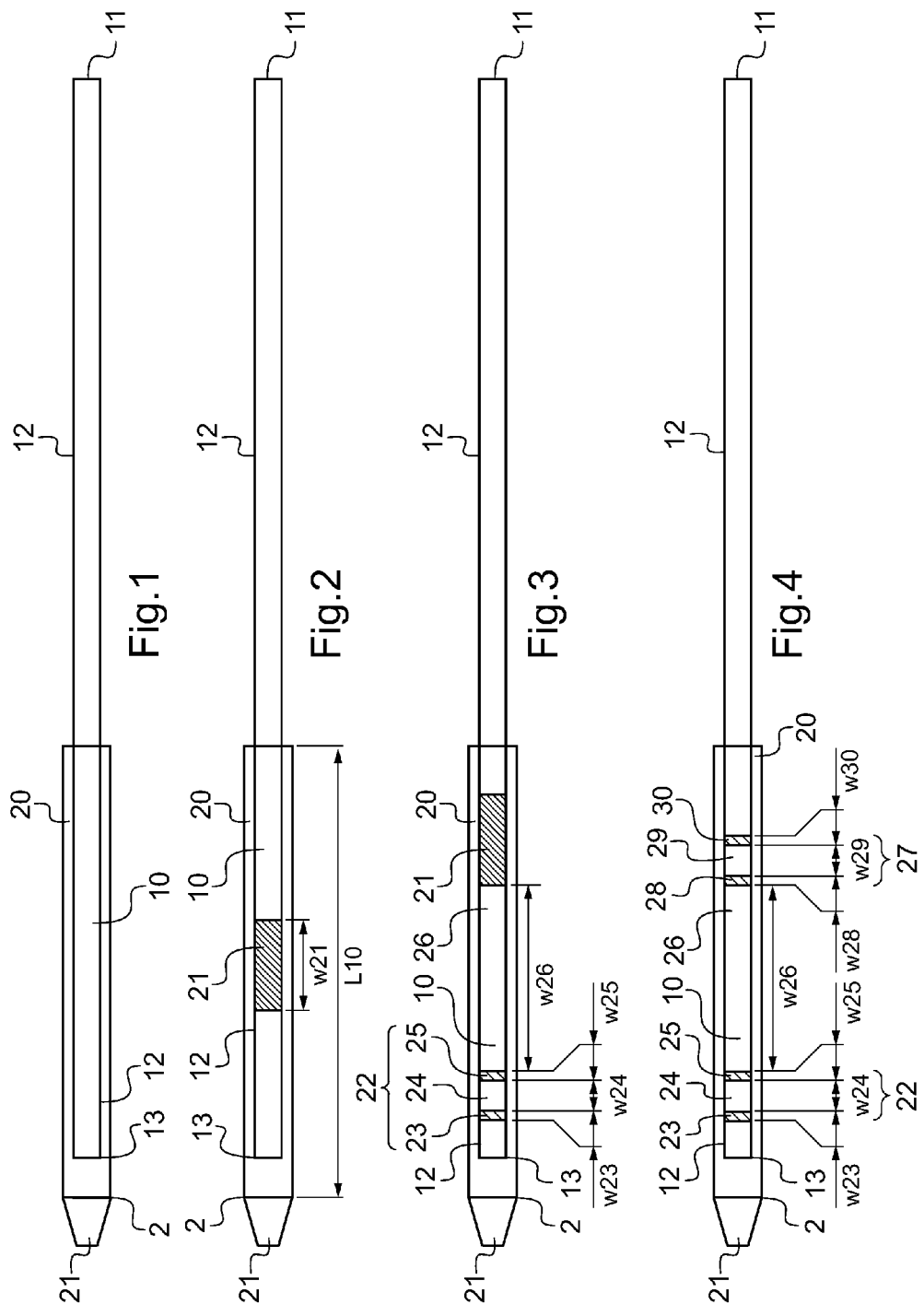

CABLE AND CABLE PULLING METHOD

FIELD OF THE INVENTION

The invention relates to cables and to cable pulling methods. A pulling element may be fixed at an end of the cable. The cable is pulled by exerting a pulling force on the pulling element.

BACKGROUND OF THE INVENTION

According to a first prior art, for example described in FIG. 1, it is known a classical cable comprising a cable core 11 surrounded by a cable outer sheath 12. FIG. 1 shows an example of a pulling grip fixed to a cable end according to first prior art. The cable outer sheath 12 of a cable end 10 of a cable 1 is surrounded by a pulling grip 20 of a pulling element 2. The cable end 10 has a length L10 that is below 1 m. The end 21 of pulling element 2 includes a pulling eye not shown on FIG. 1. With the help of the pulling element 2 on which a pulling effort is applied, the cable 1 can be pulled in a duct in order to be installed.

Cable 1 can be installed in a duct or in a casing by exerting a pulling force on a pulling wire that is attached to a pulling eye itself attached to the end 10 of the cable 1. When installing a cable 1 in this manner, the pulling force is exerted by the pulling grip 20 on the outer surface 12 of the cable 1, that is to say on the outer sheath 12 or on the outer jacket 12 of the cable 1.

In some cable designs, especially in optical cables without or with a limited amount of aramide underneath the outer jacket 12 and where internal elements of cable core 11 are rather loose in the design, such as for example high fiber count Flextube® cables, the pulling forces are not transferred or practically not transferred on the internal components of the cable core 11. Consequently, most of the pulling force is supported by the outer jacket 12 and the outer jacket 12 may fail, that is to say be torn, under these circumstances. The pulling grip 20, or the pulling nail which can be used instead, gets disconnected from the cable 1.

In other cable designs, especially in optical cables where internal elements of cable core 11 are rather tight in the design, the pulling forces are somewhat transferred on the internal components of the cable core 11. Consequently, only a part of the pulling force is supported by the outer jacket 12, but the outer jacket 12 may however fail, that is to say be torn, under these circumstances. The pulling grip 20, or the pulling nail which can be used instead, can get disconnected from the cable 1, even if it is for a higher pulling force than for a cable with a loose design.

In a second prior art, for example described in application WO 2000/60714 A1, it is disclosed a device for connecting the end of a wire or of a cable. This device comprises a ring provided with one or more longitudinal grooves and an end piece provided with the same number of longitudinal grooves. The grooves in the ring and the end piece form a chamber into which a wire of a cable can be inserted. When the ring is rotated over the end piece the wire(s) are grasped and locked. This device can be used for drawing wires or cables in ducts or casings. A drawback of this second prior art is a relative complexity. Indeed, it is needed to directly connect pulling element to the internal components of cable core rather than merely on the cable outer sheath.

In a third prior art, for example described in application CN101359817A, it is disclosed an integrated pulling eye with a pulling grip where slipping of the cable is prevented by using a special clamping structure in the pulling grip. A drawback of this third prior art is a relative complexity. Indeed, it is needed a specific structure of the pulling grip. Moreover, the clamping of the pulling grip on outer sheath of cable may not avoid the outer sheath to be torn if pulling force exceeds a threshold, even a relatively low one, since here again cable outer sheath is alone to bear the effect of the pulling force.

SUMMARY OF THE INVENTION

The object of the present invention is to alleviate at least partly the above mentioned drawbacks.

More particularly, the invention aims to help transferring more of a pulling force exerted on cable outer sheath, to a cable core, that is to say to at least some internal components or elements of cable core. That way, the failure threshold of cable outer sheath, for example when cable outer sheath is torn, is increased, thanks to a more equitable repartition of the pulling force between cable outer sheath and cable core.

According to some embodiments of the invention, in the cable, there will be a coupling of the inner elements of the cable all together with the outer jacket or with the outer sheath in order to have the pulling load distributed over all the cable elements.

According to some embodiments of the invention, this better repartition of the pulling load is performed through better coupling of cable outer sheath and cable core, by increasing pressure of cable outer sheath on cable core. In optical cables, the optical fibers then participate significantly to absorb the pulling effort when the cable is pulled in the duct.

According to some embodiments of the invention, at least the respective elongations of internal components of cable core, like optical fibers, on the one side and of cable outer sheath on the other side, will be reduced too. This helps avoiding deterioration of the cable design.

According to some embodiments of the invention, the use of one or more rings surrounding cable outer sheath will increase the pulling force that can be exerted on the cable without failing of the outer sheath and disconnection of the pulling grip, or even of a pulling nail, from the cable.

One object of the invention is achieved with a cable comprising a cable outer sheath surrounding a cable core and at least a ring surrounding partly said cable outer sheath so that said ring presses said cable outer sheath on said cable core in a way adapted to increase a transfer of a pulling effort exerted on said cable outer sheath to said cable core.

Another object of the invention is achieved with a method of cable pulling including a step of pulling a pulling element fixed on a cable end comprising a cable outer sheath surrounding a cable core and at least a ring surrounding partly said cable outer sheath so that said ring presses said cable outer sheath on said cable core so that a transfer of a pulling effort exerted on said cable outer sheath to said cable core, is increased.

Preferred embodiments comprise one or more of the following features:
- said ring surrounds partly a cable end outer sheath.
- said ring is shrunk on said cable outer sheath.
- said ring is shrunk on said cable outer sheath in such a way that said ring external diameter is reduced by at least 5%, preferably by at least 10%.
- at least two rings, preferably at least three rings, more preferably at least four rings, surround partly said cable outer sheath so that said rings press said cable outer sheath on said cable core in a way adapted to increase a transfer of a pulling effort exerted on said cable outer sheath to said cable core.

a distance between at least two of said rings, ranges from 10 cm to 100 cm, preferably ranges from 20 cm to 60 cm.

at least one of said rings presents a width which is at least three times larger than the width of another of said rings.

the thickness of said ring or of one or more or all of said rings, ranges from 1 mm to 5 mm, preferably ranges from 2 mm to 4 mm the width of said ring or of one or more or all of said rings, ranges from 10 mm to 40 mm, preferably ranges from 15 mm to 30 mm a distance between at least two of said rings, ranges from 5 mm to 50 mm, preferably ranges from 10 mm to 30 mm said ring is made of ductile material.

said ring is made of metal and preferably is made of aluminum or copper, or is made of steel.

the cable core includes internal elements which are loose with respect to one another at a position along the cable where there is no ring on the outer sheath and which are tight with respect to one another at a position along the cable where there is a ring on the outer sheath.

said pulling element shrinks on said cable end when said pulling element is pulled.

said pulling element is a pulling eye fixed to a pulling grip.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 1 shows an example of a pulling grip fixed to a cable end according to first prior art.

FIG. 2 shows an example of a pulling grip fixed to a cable end according to a first embodiment of the invention.

FIG. 3 shows an example of a pulling grip fixed to a cable end according to a second embodiment of the invention.

FIG. 4 shows an example of a pulling grip fixed to a cable end according to a third embodiment of the invention.

DETAILED DESCRIPTION OF THE INVENTION

Figure 2A:
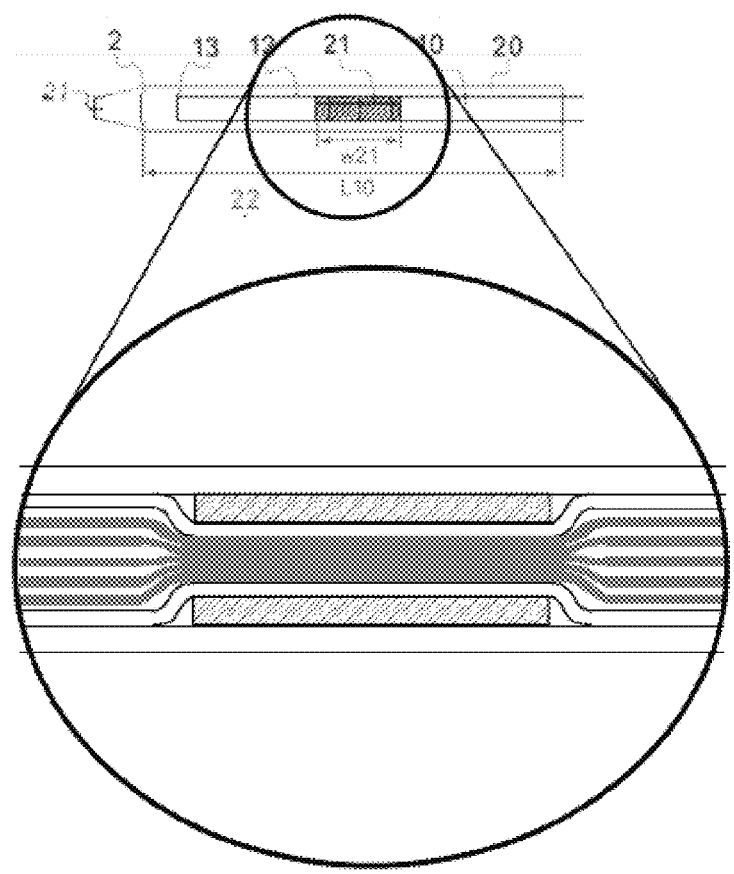
FIG. 2a shows an exploded view of FIG. 2.
Figure 2B:
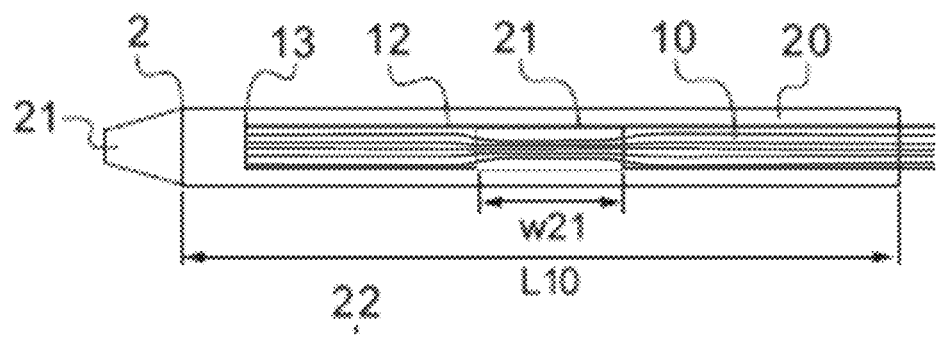
FIG. 2b shows lines in FIG. 2 representing the optical elements wherein these lines are closer to each other under a ring, and the diagonal fill in the ring has been removed to be able showing that the elements are tight when a ring is present.

On all FIGS. 2 to 4, whether it is noted on these figures or not, the widths of rings or spaces or other elements are the respective dimensions of these elements along the length of the cable and noted W. For example for ring 21, its width is W21. The length of a space between two rings will be called the distance between those two rings.

A pulling grip is a flexible socket of braided material, for example made of metal, aramide, or other high strength synthetic materials, that is placed around an end of a cable. If a soft pulling grip is used, the maximum length of the pulling grip should be limited to easily go through bended ducts. In this case, for example for a 16 mm diameter cable, length for pulling grip should not be more than 900 mm.

A pulling eye is an element made of metal, aramide, or other high strength synthetic material, that forms an eye to which a pulling wire can be attached so that a pulling force can be exerted on a cable. A pulling eye may also be attached to a pulling grip so as to form an integral part with the pulling grip.

If a rigid pulling nail is used instead, the maximum length of the pulling nail should be limited to easily go through bended ducts. In this case, for example for a 16 mm diameter cable, length for pulling nail should not be more than 180 mm.

FIG. 2 shows an example of a pulling grip fixed to a cable end according to a first embodiment of the invention. By way of example, the cable 1 is an optical cable presenting an external diameter of 16 mm, and comprising about 720 optical fibers. A cable core 11 is surrounded by a cable outer sheath 12. The cable outer sheath 12 of a cable end 10 of a cable 1 is surrounded by a pulling grip 20 of a pulling element 2. The cable end 10 has a length L10 that is below 1 m, for example about 50 cm. The end 21 of pulling grip 20 is adapted to receive a pulling eye not shown on figures to constitute the pulling element 2. With the help of the pulling element 2 on which a pulling effort is applied, the cable 1 can be pulled in a duct in order to be installed. Cable 1 can be installed in a duct or in a casing by exerting a pulling force on a pulling wire which is attached to a pulling eye itself attached to the end 10 of the cable 1. When installing a cable 1 in this manner, the pulling force is exerted by the pulling grip 20 on the outer surface 12 of the cable 1, that is to say on the outer sheath 12 or on the outer jacket 12 of cable 1.

Here, a ring 21, presenting a width W21 of about 7 cm, is located at about 20 cm of the very end 13 of cable 1. A ring or a couple of rings presenting much lower width could be used instead, for example two rings large of 15 mm separated by a distance of 15 mm could be used instead. This ring 21 is so wide that it can be called a sleeve. This ring 21 is crimped on the cable outer sheath 12. This ring 21 couples, at ring 21 level, cable core 11 with cable outer sheath 12. A pulling grip 20 will surround this ring 21. The pulling grip 20 will grip on the ring 21 as well as on the cable outer sheath 12 of cable end 10, on both sides of the ring 21. Thanks to said coupling, because of ring 21 presence, a bigger part of the pulling force exerted on outer sheath 12 will be transferred to cable core 11, than if there were no such ring. Indeed, the ring 21 presses cable outer sheath 12 on cable core 11 in a way adapted to increase a transfer, to cable core 11, of a pulling effort exerted on cable outer sheath 12.

Since it is easier to pull the cable by exerting a pulling force on one of its ends, the ring 21 surrounds partly cable end 10 outer sheath 12. The ring 21 is shrunk or crimped on cable outer sheath 12 to better couple cable outer sheath 12 with cable core 11. Shrinking or crimping will both be used in following texts, they are considered to vehicle the same idea. The crimped ring 21 has an external diameter close to the nominal cable external diameter in order not to have too prominent protrusions from cable outer sheath in order to avoid gripping within the duct while pulling the cable. The crimped ring 21 practically does not affect the cable 1 external diameter.

Preferably, the ring 21 is shrunk on cable outer sheath 12 in such a way that the ring 21 external diameter is reduced by at least 5%, preferably by at least 10%. In an example, a ring presenting an original internal diameter of 21.5 mm and of external diameter of 25.5 mm is slide first around a cable presenting an external diameter of 21 mm. After crimping on cable outer sheath 12, the external diameter of the ring 21 is around 21 mm and the internal diameter of the ring 21 is around 19 mm.

In order to make easier shrinking or crimping of ring 21 on cable outer sheath 12, the ring 21 is made of ductile material. For example ring 21 can be made of aluminum or of copper.

In a preferred structure of cable 1, for which one or more rings are especially useful, the cable core 11 includes internal elements which are loose with respect to one another at a position along the cable where there is no ring on the outer sheath and which are tight with respect to one another at a position along the cable where there is a ring on the outer sheath, for example at ring 21 level. Preferably, this cable core 11 includes radial strength members with no aramide or with very little aramide. Such relatively loose cable design can be a cable including one or more Flextube®. This Flextube® cable is an optical cable in which the optical fibers are grouped in one or more modules, each module comprising multiple optical fibers covered by a thin flexible layer of polymer material and a single outer sheath surrounding the one or more modules. This single outer sheath may include two embedded strength members.

FIG. 3 shows an example of a pulling grip fixed to a cable end according to a second embodiment of the invention. From the very end 13 of cable 1, there are a free part of outer sheath 12, a first series 22 of rings 23 and 25 separated by a space 24, a space 26, and a sleeve 21. All preceding elements will then be surrounded by pulling grip 20 of pulling element 2, before exerting a pulling force on pulling element 2. Ring 23 is located at 9 cm of the very end 13 of cable 1. Ring 23 width W23 is 15 mm Ring 25 width W25 is 15 mm. Ring 23 and ring 25 are spaced apart, and the in between space 24 width W24 is 15 mm. The space 26 located between series 22 and sleeve 21, more precisely between ring 25 and sleeve 21, presents a width W26 which is 20 cm. Sleeve 21 presents a width W21 which is 7 cm.

Space 24 lying between rings 23 and 25 presents excess material thickness due to neighbor crimping of rings 23 and 25 on cable outer sheath 12. The pulling grip will grip all the more this exceeding material which will in turn transfer more easily pulling force due to presence of neighbor rings 23 and 25.

Space 26 lying between series of rings 23 and 25 on the one side and sleeve 21 on the other side, is relatively long as well as well coupled to cable core 11 due to rings 23 and 25 and sleeve 21. The pulling grip will grip the outer sheath 12 in space 26 which will in turn transfer more easily pulling force due to effective coupling to cable core 11 thanks to presence of relatively close rings 23 and 25 and relatively close sleeve 21.

FIG. 4 shows an example of a pulling grip fixed to a cable end according to a third embodiment of the invention. This cable 1 is the same as on FIG. 3 except that sleeve 21 has been replaced by a second series 27 of rings 28 and 30 separated by a space 29. Ring 28 is located at 20 cm of ring 25. Ring 28 width W28 is 15 mm. Ring 30 width W30 is 15 mm. Ring 28 and ring 30 are spaced apart, and the in between space 29 width W29 is 15 mm. Two series of two rings appear to be an optimal since they seem to be sufficient for high levels of pulling force, and since they are much better than a single series of two rings or than a sleeve as in FIG. 2.

In cable 1 of FIGS. 3 and 4, at least two rings 23 and 25, preferably at least three rings, that is to say rings 23 and 25 and sleeve 21, more preferably at least four rings 23, 25, 28 and 30, surround partly said cable outer sheath 12 so that these rings press cable outer sheath 12 on cable core 11 in a way adapted to increase a transfer, to cable core 11, of a pulling effort exerted on cable outer sheath 12. Several or many separated and spaced apart rings do not affect the cable 1 flexibility.

A distance 26 between at least two of said rings, between for example ring 23 and ring 30 on FIG. 4, ranges from 10 cm to 100 cm, preferably ranges from 20 cm to 60 cm. At least one ring presents a width which is at least three times larger than the width of another said ring: the sleeve 21 of FIG. 3 is 7 cm large whereas ring 23 is only 15 mm large. In cable 1 of FIGS. 3 and 4, the thickness of said ring or of one or more or all of said rings, ranges from 1 mm to 5 mm, preferably ranges from 2 mm to 4 mm. This thickness is along a radial dimension of the cable 1. Preferably, the width of said ring or of one or more or all of said rings, except for the sleeve 21, ranges from 10 mm to 40 mm, preferably ranges from 15 mm to 30 mm. A distance 24 between two rings 23 and 25 and a distance 29 between two rings 28 and 30, ranges from 5 mm to 50 mm, preferably ranges from 10 mm to 30 mm.

Tests have been made with cables corresponding respectively to FIGS. 1 to 4 and fixed to the same pulling element. The cables are all optical cables each comprising 720 optical fibers and presenting a 16 mm diameter. The maximal resistance to pulling effort of this type of cable is specified to be 200 daN. The cables only differ by the number and locations of rings crimped on cable outer sheath. This pulling element is a pulling grip fixed to a pulling eye, presenting a length of 750 mm, a diameter in the range 15/25 mm, and whose reference is G106/10 in the catalog of CEVAM®. Pulling efforts with different forces expressed in daN are applied on the cable to pull it. Those pulling efforts are applied each during 5 minutes. For each pulling effort value, the cable core shrinking along the cable outer sheath is measured and the state of outer sheath strength members as well as the state of outer sheath itself is controlled. OK means there is no deterioration. When there is a deterioration, the type of deterioration is explained.

Results of pulling efforts application on cable of FIG. 1 are given in table 1.

TABLE 1

| Values of pulling effort maintained during 5 minutes | Shrinking of cable core with respect to outer sheath | Deterioration? |
| --- | --- | --- |
| 200 daN | 24 cm | Strength members breaking |

Results of pulling efforts application on cable of FIG. 2 are given in table 2.

TABLE 2

| Values of pulling effort maintained during 5 minutes | Shrinking of cable core with respect to outer sheath | Deterioration? |
| --- | --- | --- |
| 200 daN | 5 cm | OK |
| 250 daN | 20 cm | Strength members breaking & outer sheath elongation at 270 seconds |

Results of pulling efforts application on cable of FIG. 3 are given in table 3.

TABLE 3

| Values of pulling effort maintained during 5 minutes | Shrinking of cable core with respect to outer sheath | Deterioration? |
| --- | --- | --- |
| 250 daN | 1 cm | OK |
| 300 daN | 1 cm | OK |
| 340 daN | 1 cm | OK |
| 390 daN | 1.5 cm | OK |
| 430 daN | 5 cm | Strength members breaking & outer sheath elongation at 90 seconds |

Results of pulling efforts application on cable of FIG. 4 are given in table 4.

TABLE 4

| Values of pulling effort maintained during 5 minutes | Shrinking of cable core with respect to outer sheath | Deterioration? |
| --- | --- | --- |
| 350 daN | 1.5 cm | OK |
| 400 daN | 2.5 cm | OK |
| 425 daN | unknown | Strength members breaking & outer sheath degradation after 300 seconds |

As already said, cable of FIG. 2 resistance to pulling effort is better than cable of FIG. 1 resistance to pulling effort. Cables of FIGS. 3 and 4 respective resistances to pulling effort are much better than cable of FIG. 2 resistance to pulling effort.

The strength members are the strength members of the cable outer sheath. In tables 2 and 3, the outer sheath elongation follows a diameter reduction of the outer sheath. In table 4, the outer sheath elongation is followed by a tear of the outer sheath.

Figure 5:
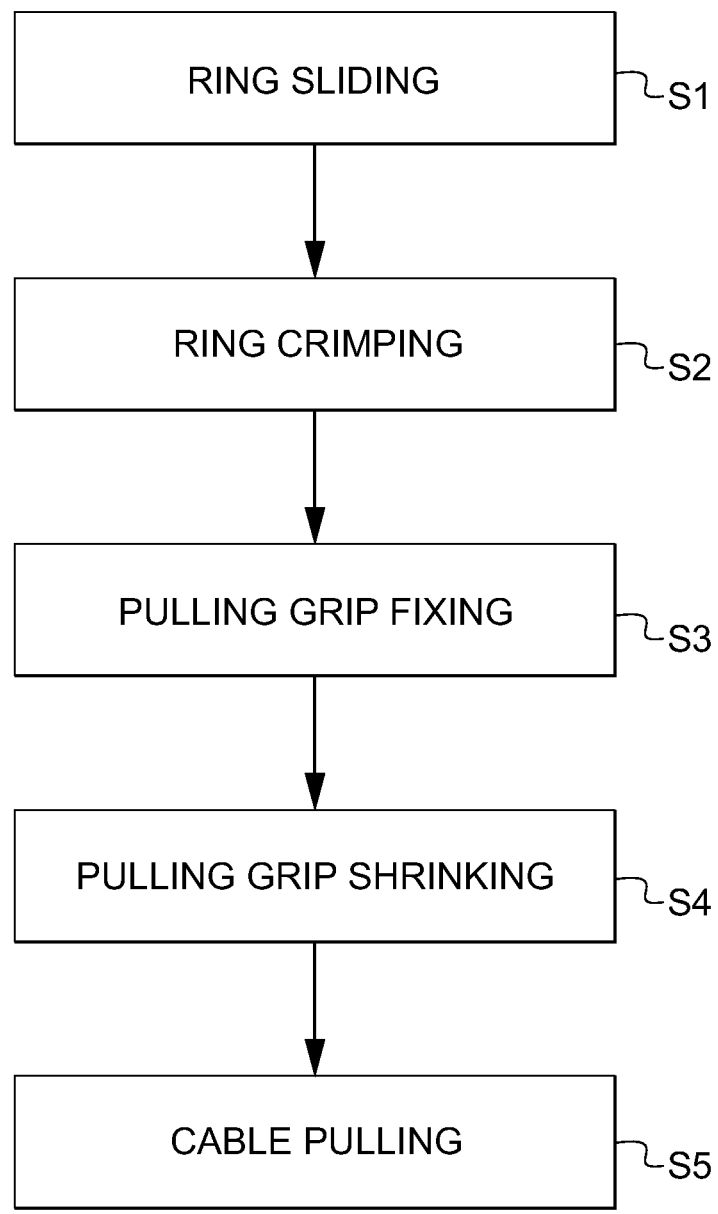
FIG. 5 shows an example of steps of a cable pulling method according to an embodiment of the invention.

FIG. 5 shows an example of steps of a cable pulling method according to an embodiment of the invention. The pulling method successively comprises a ring sliding step S1, a ring crimping step S2, a pulling grip fixing step S3, a pulling grip shrinking step S4, a cable pulling step S5.

In ring sliding step S1, one or more rings are slide around the outer sheath of a classical cable comprising a cable core surrounded by the outer sheath.

In ring crimping step S2, the ring or the rings are crimped on the outer sheath of cable so that outer sheath is coupled to cable core.

In pulling grip fixing step S3, the pulling grip is put around the outer sheath and the rings located at the end of the cable. At the end of the pulling grip is fixed a pulling eye. Instead of the pulling grip, there could be a pulling nail, but this is less efficient, because pulling nail does not surround all the different rings.

In pulling grip shrinking step S4, a pulling effort starts to be exerted on the pulling element so that the pulling grip, which is preferably a flexible socket of braided material, shrinks on the cable end outer sheath and on the cable end ring(s) so that cable end is tight within pulling grip.

In cable pulling step S5, a pulling effort continues to be exerted on the pulling element so that the cable is pulled. During cable pulling, the ring or the rings press the cable outer sheath on the cable core so that the transfer, to the cable core, of the pulling effort exerted on said cable outer sheath is increased.

The invention has been described with reference to preferred embodiments. However, many variations are possible within the scope of the invention.

The invention claimed is:

1. A cable, comprising:
   a cable outer sheath surrounding a cable core comprising fibers; and
   at least a ring surrounding partly said cable outer sheath so that said ring presses said cable outer sheath on said cable core in a way adapted to increase a transfer of a pulling effort exerted on said cable outer sheath to said cable core,
   wherein the cable core includes internal elements which are loose with respect to one another at a position along the cable where there is no ring on the cable outer sheath and which are tight with respect to one another at a position along the cable where there is a ring on the cable outer sheath.

2. The cable according to claim 1, wherein said ring surrounds partly a cable end outer sheath.

3. The cable according to claim 2, wherein said ring is shrunk on said cable outer sheath.

4. The method according to claim 3, wherein said ring is shrunk on said cable outer sheath in such a way that said ring external diameter is reduced by at least 5.

5. The cable according to claim 2, wherein said ring is shrunk on said cable outer sheath in such a way that said ring external diameter is reduced by at least 5%.

6. The cable according to claim 2, wherein said ring is shrunk on said cable outer sheath in such a way that said ring external diameter is reduced by at least 10%.

7. The cable according to claim 1, wherein at least two rings surround partly said cable outer sheath so that said rings press said cable outer sheath on said cable core in a way adapted to increase a transfer of a pulling effort exerted on said cable outer sheath to said cable core.

8. The cable according to claim 7, wherein a distance between at least two of said rings, ranges from 10 cm to 100 cm.

9. The cable according to claim 7, wherein a distance between at least two of said rings, ranges from 20 cm to 60 cm.

10. The cable according to claim 1, wherein at least one of said rings presents a width which is at least three times larger than the width of another of said rings.

11. The cable according to claim 1, wherein the thickness of said ring or of one or more or all of said rings, ranges from 1 mm to 5 mm.

12. The cable according to claim 1, wherein the width of said ring or of one or more or all of said rings, ranges from 10 mm to 40 mm.

13. The cable according to claim 1, wherein a distance between at least two of said rings, ranges from 5 mm to 50 mm.

14. The cable according to claim 1, wherein said ring is made of ductile material.

15. The cable according to claim 1, wherein said ring is made of metal and preferably is made of aluminum or copper, or is made of steel.

16. The cable according to claim 1, wherein at least three rings surround partly said cable outer sheath so that said rings press said cable outer sheath on said cable core in a way adapted to increase a transfer of a pulling effort exerted on said cable outer sheath to said cable core.

17. The cable according to claim 1, wherein at least four rings surround partly said cable outer sheath so that said rings press said cable outer sheath on said cable core in a way adapted to increase a transfer of a pulling effort exerted on said cable outer sheath to said cable core.

18. A method for cable puffing, comprising:
pulling a pulling element fixed on a cable end comprising a cable outer sheath surrounding a cable core comprising optical fibers and at least a ring surrounding partly said cable outer sheath so that said ring presses said cable outer sheath on said cable core so that a transfer of a pulling effort exerted on said cable outer sheath to said cable core, is increased,
wherein the cable core includes internal elements which are loose with respect to one another at a position along the cable where there is no ring on the cable outer sheath and which are tight with respect to one another at a position along the cable where there is a ring on the cable outer sheath.

19. The method of cable pulling according to claim 18, wherein said pulling element shrinks on said cable end when said pulling element is pulled.

20. The method of cable pulling according to claim 19, wherein said pulling element is a pulling eye fixed to a pulling grip.

* * * * *